United States Patent
Gemelos et al.

(10) Patent No.: US 7,789,757 B2
(45) Date of Patent: Sep. 7, 2010

(54) VIDEO GAMES ON DEMAND WITH ANTI-PIRACY SECURITY

(75) Inventors: Steve Gemelos, Cupertino, CA (US); Anthony Petronelli, San Jose, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 974 days.

(21) Appl. No.: 11/233,383

(22) Filed: Sep. 22, 2005

(65) Prior Publication Data

US 2007/0066490 A1 Mar. 22, 2007

(51) Int. Cl.
*G06F 17/00* (2006.01)
*G06F 19/00* (2006.01)

(52) U.S. Cl. .............. 463/42; 463/40; 463/41; 725/25; 725/37; 725/100; 725/133

(58) Field of Classification Search ............. 463/40–42; 725/25, 37, 100, 133
See application file for complete search history.

(56) References Cited

U.S. PATENT DOCUMENTS

| | | | | |
|---|---|---|---|---|
| 5,851,149 A * | 12/1998 | Xidos et al. | .................... | 463/42 |
| 5,935,004 A * | 8/1999 | Tarr et al. | ..................... | 463/40 |
| 6,227,974 B1 * | 5/2001 | Eilat et al. | ..................... | 463/40 |
| 6,884,171 B2 * | 4/2005 | Eck et al. | ....................... | 463/42 |
| 6,929,549 B1 * | 8/2005 | Yamada | ........................ | 463/42 |
| 7,027,768 B2 * | 4/2006 | Hill | ............................ | 455/3.06 |
| 7,076,774 B2 * | 7/2006 | Chrysanthakopoulos et al. | .......... | 717/153 |
| 7,243,364 B2 * | 7/2007 | Dunn et al. | ................... | 725/93 |
| 7,306,522 B2 * | 12/2007 | Silver et al. | ................... | 463/41 |
| 7,465,231 B2 * | 12/2008 | Lewin et al. | ................. | 463/37 |
| 7,631,325 B2 * | 12/2009 | Rys et al. | ..................... | 725/25 |
| 7,695,369 B2 * | 4/2010 | Winkler | ....................... | 463/42 |
| 2001/0016519 A1 * | 8/2001 | Choe | .......................... | 463/42 |
| 2002/0066100 A1 * | 5/2002 | Hoang | ......................... | 725/39 |
| 2003/0001978 A1 * | 1/2003 | Smith et al. | .................. | 348/714 |
| 2004/0025190 A1 * | 2/2004 | McCalla et al. | ............. | 725/133 |
| 2004/0097288 A1 * | 5/2004 | Sloate et al. | ................. | 463/42 |
| 2004/0168202 A1 * | 8/2004 | Ebihara | ...................... | 725/133 |
| 2005/0261062 A1 * | 11/2005 | Lewin et al. | ................. | 463/42 |
| 2005/0282636 A1 * | 12/2005 | O'Brien | ...................... | 463/42 |
| 2006/0059213 A1 * | 3/2006 | Evoy | .......................... | 708/135 |
| 2006/0068919 A1 * | 3/2006 | Gottfurcht | .................. | 463/42 |
| 2006/0136964 A1 * | 6/2006 | Diez et al. | .................... | 725/37 |
| 2006/0225107 A1 * | 10/2006 | Seetharaman et al. | ....... | 725/100 |
| 2007/0275781 A1 * | 11/2007 | Marshall et al. | .............. | 463/42 |

* cited by examiner

*Primary Examiner*—Peter DungBa Vo
*Assistant Examiner*—Milap Shah
(74) *Attorney, Agent, or Firm*—Toler Law Group

(57) ABSTRACT

Systems, methods and computer-readable media are described for the automated payment, download over a network, installation on a set-top box, and play of console and online video games by user interaction with a controller-adapted set-top box. Security measures inhibit video game piracy.

20 Claims, 5 Drawing Sheets

VIDEO GAMES ON DEMAND WITH ANTI-PIRACY SECURITY

FIELD OF THE DISCLOSURE

The present disclosure relates to telecommunications networks and in particular to systems, methods and machine-readable media for the delivery of video games over a network to a television set-top box, installation of the game on the set-top box, and play of the installed game through the set-top box.

BACKGROUND

The television set-top box (STB) and its associated remote control allow a television viewer to interact with the television set. For example, the viewer may use the STB remote control device to have the television display a guide that shows the schedule of television shows available for viewing. Another example of interactivity, for STBs that provide video recording functions, is to interact with the on-screen guide to schedule the recording of television programs and to view the recorded programs at a time convenient to the viewer. STB interactivity is facilitated by the fact that STBs, which are associated with cable or satellite television service providers, provide a broadband network connection for the delivery of programming and services via the television set.

Satellite and television service providers have recently made available Video on Demand (VOD) services, which allow viewers to order pay-per-view programming, such as a movie, for viewing at anytime, independent of a programming schedule. A subscriber may order, stop, pause, fast forward, rewind and restart a movie or event in real time, on demand. VOD applications make use of local storage on a set-top box in the user's home.

Video games are another way in which people interact with a television set. Many popular video games require a specialized STB commonly referred to as a console or platform. Console games are often played with one or two controllers connected to the console, either physically (wire) or wirelessly. Most commonly, one player plays against the computer (housed in the console) or two players play against each other, with each player connected directly to the console.

Console games are stored on a machine-readable medium such as a CD-ROM, magnetic tape cartridge, or a memory chip (for saved games). To acquire the game, players typically purchase it on a CD-ROM, for example, place the CD in the console and load the game software. The game media are also available for rent just as are motion picture DVDs.

Many of the most advanced consoles and games allow for network play, also called online play, in which the player, through the console, logs into a network such as the Internet, and plays against other players in remote locations who are also logged into the same game. Even for online playing, however, the player has to have access to the game in a tangible medium, at least at one time.

Simple computer games such as card games like solitaire or video poker, and logic games like mine sweeper, are familiar to computer users. Modern video games and online role playing games, however, require a very high degree of sophisticated interaction and graphics display. A state of the art console game requires the display of dynamically interactive environments such as a jungle. A player-controlled character navigates through the environments. Artificial intelligence units such as enemy soldiers react to the motion of the player-controlled character. Complex on-screen menus display items such as weapons, camouflage, and survival gear. On-screen communication menus allow the player-controlled character to communicate with superior officers, technical experts and the like. Cut sequences of video reward the player with plot-advancing movies upon the attainment of a game milestone. Similar complexity is found in online role-playing games. The degree and sophistication of interactivity required by console video and online role-playing games exceed that of VOD applications or computer card games.

Console-type video games are typically played by using a game controller device that is connected either by wireline or wirelessly to the console. For the purposes of the present disclosure, a game console is deemed to be included in the definition of set-top box. Controllers convey instructions or commands to the controllable element(s) on the screen. Such instructions include, for example, horizontal and vertical movement, actions such as shooting or fighting, interaction with other screen elements, such as picking them up, throwing them or speaking to them, accessing game menus such as inventory items, maps and so forth, as well as game functions such as pausing the game, saving a game in progress, and loading saved games.

A popular form of video gaming is the networked multi-player game. An online gaming server enables the networked game play. The customer/player starts their game locally, sets their preferences (such as skill level) and then requests a connection to the online gaming server. Once connected, the server groups the player with other online players based on their preferences. The games are played locally except that, to reduce the bandwidth requirements, updates on other player's locations are provided over the network connection. The online gaming service may be provided through the service provider's network, which also maintains the online gaming. Even so, there may be glitches in the game experience due to network delays.

Video Game on Demand server systems are available that stream game content to the user STB and execute controller commands also through the STB over a broadband network. Existing Game on Demand server systems, however, do not download the game for installation on the subscriber's set-top box. Rather, the game remains resident on the server, which processes the controller commands over the network. Accordingly, Game on Demand server systems consume broadband bandwidth during the entire play session. A Gaming on Demand system of the present disclosure, however, consumes bandwidth mainly only during the time it takes to download the game software to a subscriber's STB. Furthermore, Game on Demand server systems typically provide game control via an STB remote control, keyboard or USB game pad, but do not contemplate the use of standard console game controllers by means of a controller-adapted STB.

Accordingly, the present disclosure describes systems, methods and computer-readable media for the automated payment, download over a network, installation on a set-top box, and play of console and online video games by user interaction with a controller-adapted set-top box. The present disclosure further addresses security measures to inhibit video game piracy.

BRIEF DESCRIPTION OF THE DRAWINGS

The present disclosure provides the detailed description that follows, by reference to the noted drawings, by way of non-limiting examples of embodiments in which reference numerals represent the same parts throughout the several views of the drawings, and in which.

DETAILED DESCRIPTION

Figure 1:
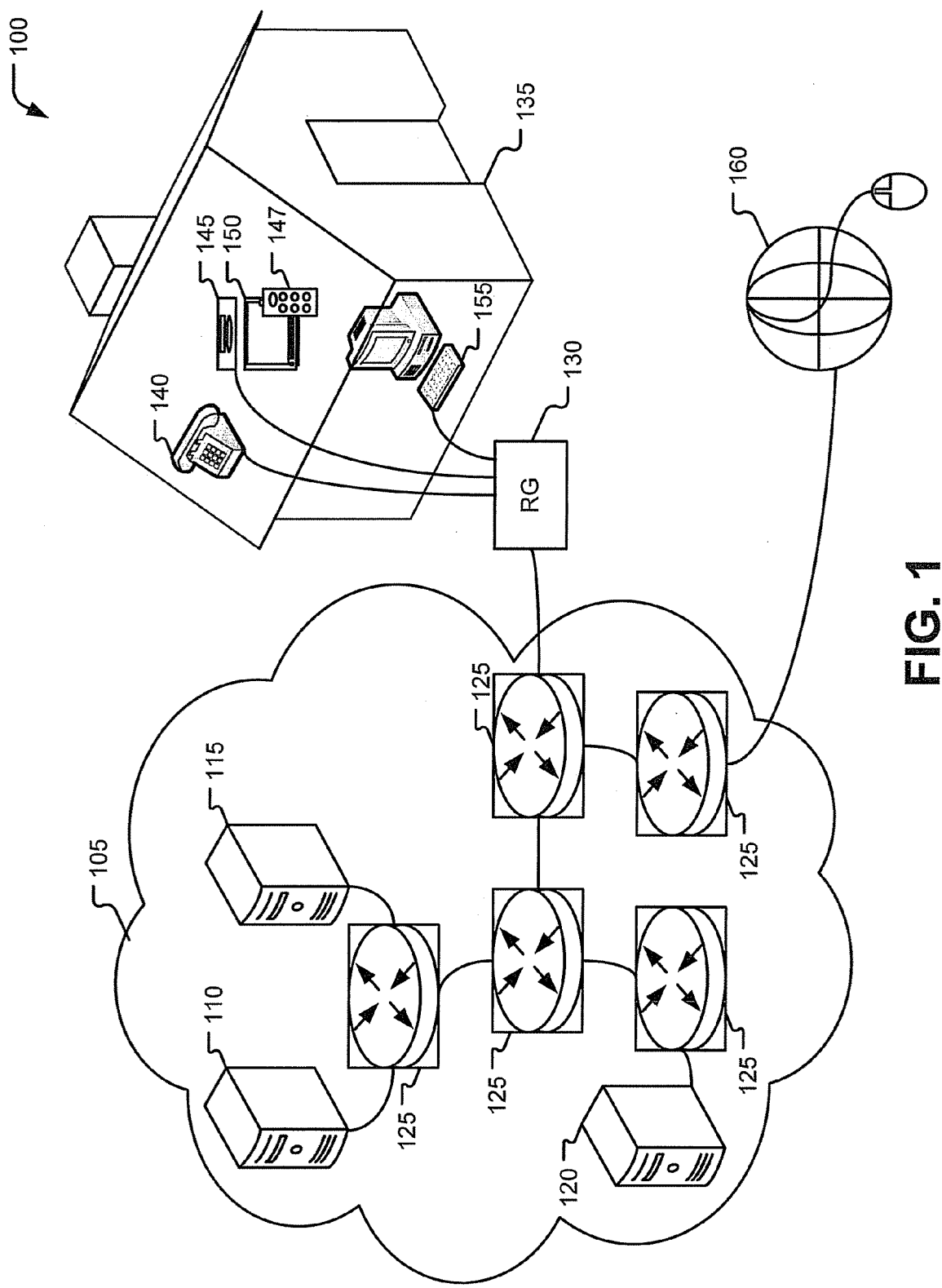
FIG. 1 is a high level diagrammatic representation of a specific exemplary embodiment of a video game on demand system of the present disclosure.

In view of the foregoing, the present disclosure, through one or more various aspects, embodiments and/or specific features or sub-components described herein, is thus intended to bring out one or more of the advantages that will be evident from the description. The present disclosure makes frequent reference to a television set-top box (STB). It is understood, however, that an STB is merely an example of a specific exemplary illustrative embodiment, and that the terminology, examples, drawings and embodiments, therefore, are illustrative rather than limiting and are not intended to limit the scope of the disclosure.

In a fiber optic network, where the bandwidth available to a network user has increased to 10 s of Mbps, new services are made possible. These services include Internet Protocol (IP)-based broadcast TV and Video-on-Demand (VOD). Video-on-Demand for example, to take one convenient example of broadband capabilities, allows the end user to select and view movies and television shows, and the content is transferred to the user through a broadband network and set-top box for viewing when they want it. VOD is different from the traditional content delivery mode, where the content is transferred to the user on a disc—a DVD—where the user must travel to the video store or wait for the disc in the mail.

Along with video rental, some retail outlets provide video game rentals for games that are generally sold for specific gaming platforms. Just as a broadband fiber optic network competes with traditional movie rentals, broadband may similarly replace store-front video game rentals.

The Gaming-on-Demand service may include, in addition to game sales, a subscription model, a game rental model, and a pay-per-play model. Subscription may include, for example, the right to rent or purchase a predetermined number of games each month for an agreed price. A rental model may be similar to an a la carte system where one or more game is selected with each access of the service with the right to unlimited game play for a predetermined amount of time, such as, for example, a week. Pay-per-play may allow a single play session for a comparatively low price.

Using a set-top-box/gaming console and a remote control, the customer scrolls through a series of menus to select the game they would like to play—most recently played games, newest releases, most popular games, action games, role-play games, and networked multiplayer games.

When the customer makes a selection, the Gaming-on-Demand server authenticates the customer's set-top-box, and from that their account information, subscription status, and informs them of the charges if it is a "pay-per-play," where play permission expires upon termination of a session of play (i.e. the customer does not have a Gaming-on-Demand subscription), at which point the customer acknowledges the charges. The charges are automatically debited to their monthly bill as an added charge based on the STB authentication. Alternative embodiments further provide that the user may purchase the game outright and have permission for unlimited play for a quoted price; and to rent the game so that play permission expires after a pre-designated period of time. After user acceptance of the debit amount to the user's account, the game is downloaded to, and installed on, their STB.

Games that are on the "Most Recently Played" list in the menu may be stored locally on the STB or on an memory card, for example in the memory of a machine-readable medium, that may be optionally detachable from the STB. The customer's gaming may begin quickly and some of the load on the service provider's network may be reduced. Even for the "Most Recently Played" games which are stored locally, however, the STB may authenticate with the Gaming-on-Demand server and verify account information as described above.

FIG. 1 is a high level diagrammatic representation of a specific exemplary embodiment of a video game on demand system 100 of the present disclosure. Service provider network 105 provides at least one broadband telecommunications medium to transmit information. Broadband media include, but are not necessarily limited to, fiber optic media and coaxial cable. Network 105 may include, but is not necessarily limited to video on demand server 110, Voice over Internet Protocol (VOIP) server 115 and game on demand server 120. Server 120, or elsewhere in the network, may house an authenticator (not shown) to receive and authenticate subscriber and STB identity. Routers 125 connect servers 110, 115 and 120 through gateway 130 to household 135, which includes networked devices telephone 140, STB 145 connected to television 150, and computer 155. STB 145 may house a machine-readable medium such as a microprocessor and digital memory for execution of one or more of the methodologies described herein. Additionally, controller 147 provides an interactive interface with STB 145, including game controller functions for playing a game on television 150 via STB 145. A system of the present disclosure enables controller commands to be executed substantially locally by the set-top box because the game software is installed on the STB, as opposed to having commands transmitted to the game server over the network for processing and back to the set-top box to update the screen display. Accordingly, a set-top box of the present disclosure functions very much like a familiar video game console platform; a difference being, of course, that the game software is obtained over a network rather than from a tangible medium such as disk.

A consideration for providing a service such as Gaming-on-Demand is digital rights management (DRM) and content security. That is, how does the service provider ensure the content owners that the content is used in accordance with the game publisher's End-User-License-Agreement (EULA)? Further, how can the service provider ensure that the content is not stolen and distributed or otherwise put in the public domain?

The present disclosure describes more than one mechanism to protect the content from piracy and provide DRM. For one, the content, the servers, and the network connections may be substantially contained in the service provider's network, as shown in FIG. 2.

Figure 2:
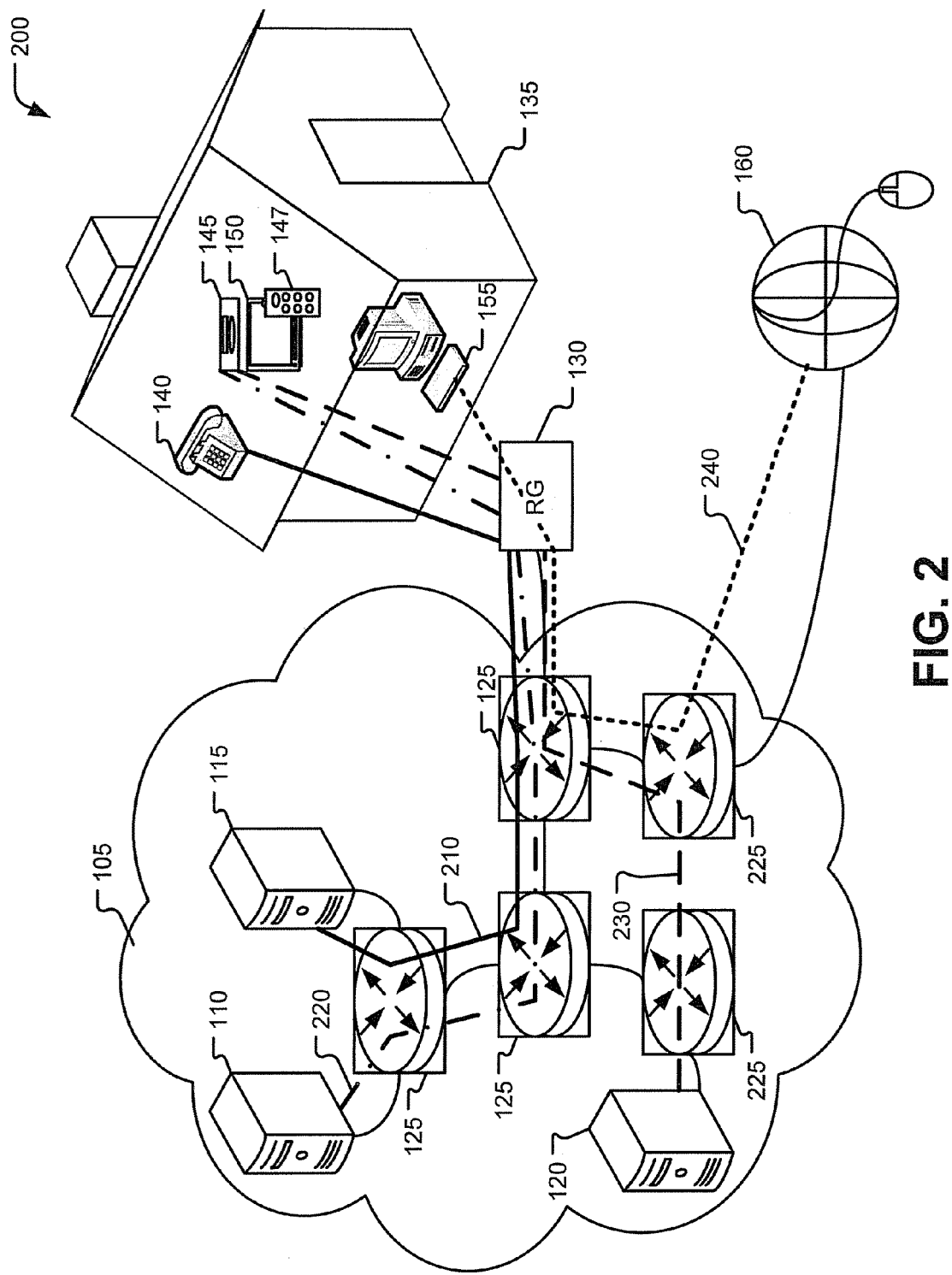
FIG. 2 is a high level diagrammatic representation of a specific exemplary alternative embodiment of a video game on demand system of the present disclosure.

Network 105 is segregated using VLANs, VPLS, MPLS, or some other network segregation technology, as shown in FIG. 2. Each different service is directed to the appropriate server. In such a configuration, the STB/gaming console only "sees" the video servers and Gaming-on-Demand server. Since the STB/gaming console cannot access or "see" the internet, the customer cannot push the content to the internet.

FIG. 2 is a high level diagrammatic representation of a specific exemplary alternative embodiment of a video game on demand system 200 of the present disclosure. VoIP connection 210 to telephone 140 is indicated by solid thin line 210. VOD connection 220 to STB 145 is indicated by dash-and-dot line 220. Game on demand server 120 connection 230 to STB 145 is indicated by thin dashed line 230. STB 145 may house a machine-readable medium such as a microprocessor and digital memory for execution of one or more of the methodologies described herein. Controller 147 provides an interactive interface with STB 145, including game controller functions for playing a game on television 150 via STB 145. Internet connection 240 to computer 155 is indicated by dotted line 240.

Gateway 130 provides game on demand permission once Rights Granted criteria have been met as described herein. Note that Internet 160 and access to public domain World Wide Web content are essentially segregated or sequestered from game on demand network 105 to inhibit release of proprietary games into the public domain and to promote compliance with Digital Rights requirements.

An additional security mechanism, discussed above, is that the user authentication process is through the STB/console. Typically, for broadband service providers, the STB is owned by the service provider and provided to the end user/customer for the duration of their service contract. Such an arrangement allows the STB to be a security component for DRM. That is, the games are selected and played through the STB. Before a game can be played, even if it is stored locally, the STB authenticates access with the Gaming-on-Demand server. The server verifies the rights of the user to play the game, identifies the STB to access the customer's account, and determines the gaming subscription selection or request authorization to charge the account for pay-per-play.

In either case, the game cannot be played without authorization from the gaming-on-demand server. The digital rights are not stored in the gaming file. Rather, the digital rights are tied to the STB and the customer's account, and are verified by the gaming-on-demand server each time the game is started. Advantageously, if the STB is disconnected from the network, the customer cannot authenticate and thus cannot play a game.

Additionally, the customer does not benefit from transferring a game file from one STB to a second STB. Generally, such transfer would not be possible, but which, nevertheless might occur if the customer found a software-hacking back door to accomplish the transfer. When the customer tries to play the game on the second STB, however, the second STB requests authentication from the gaming-on-demand server and such authorization is denied due to failure of STB authentication.

Alternative embodiments provide kits that include, but are not necessarily limited to, a controller-adapted STB to receive and process commands from a game controller, a controller adapted to send and receive (for example, to provide vibration function for vibration-enabled games) commands from the STB, on or more STB adapter to convert a substantially standard STB to a controller-adapted STB, and a machine-readable media, such as a compact disk (CD), containing the requisite software for the system to work.

Figure 3:
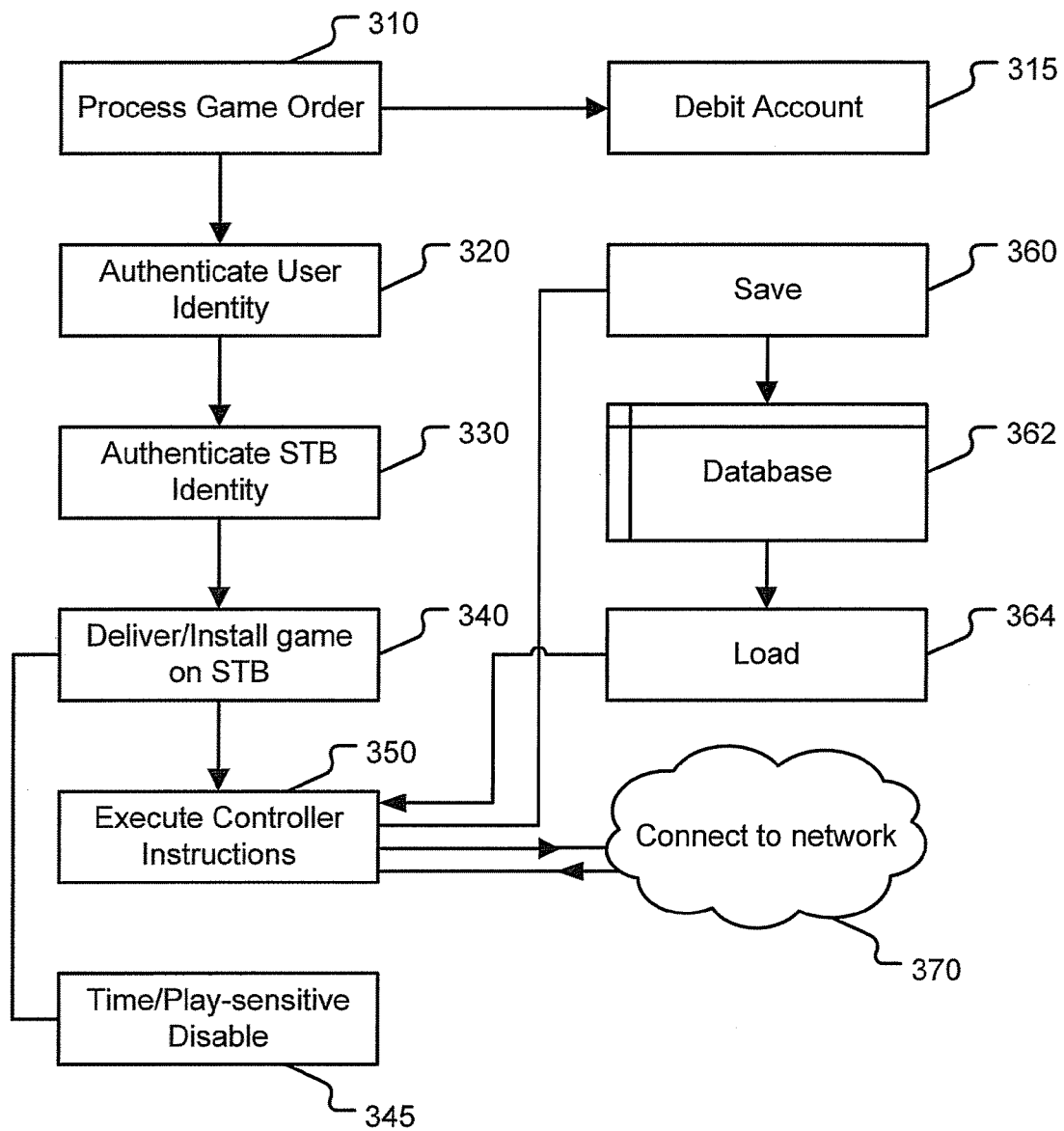
FIG. 3 is a diagrammatic representation of a high level process flow of a specific exemplary embodiment of the present disclosure.

FIG. 3 is a diagrammatic representation of a high level process flow of a specific exemplary embodiment of the present disclosure. Process steps may include processing the game order 310 and debiting the subscriber's account 315 accordingly; authenticating the user's identity 320; authenticating the identity of the set-top box 330; delivering and installing the game on the set-top box 340 and executing controller instructions or commands 350 for game play. For purposes of the present disclosure, the term "deliver" contemplates, in addition to the transmission or download of game software, but also the installation and loading the game software.

In the case where the payment option selected by the subscriber is pay-per-play, subscription or rental 345, the game download may include, for example, code to automatically disable the game 345 upon the occurrence of a suitable predetermined contingency such as the expiration of a predetermined amount of time or after a predetermined number of playing sessions.

The game software installed locally on the subscriber's set-top box enhances the game play experience by reducing hesitation, stutters, update delays or other artifacts that network traffic, server glitches or other anomalies Game on Demand servers in a network might introduce into the responsiveness of the game.

Additional functions may include saving 360 to save a game in progress, for example, to database 362, which is maintained in the memory of a machine-readable medium of the set-top box, for example. A saved game may be loaded 364 from memory for continued play 350. A new game or a loaded saved game may further be played online with other remote players upon connection 370 of the set-top box to a network for network play.

The present disclosure contemplates that the STB is adapted to operate with a game controller. In the case where the STB is a gaming console, the STB is already adapted for the controller. In the case where the STB is also a cable or satellite television set-top box, however, the STB may need to be adapted to work with a game controller, particularly where the game controller is a device other than the STB remote control. Such adaptation may be accomplished, for example, by an adapter that connects to a STB to make the STB game-ready and able to receive and process controller commands, or by virtue of integrated controller communication and processing devices such as are known with traditional game consoles.

Figure 4:
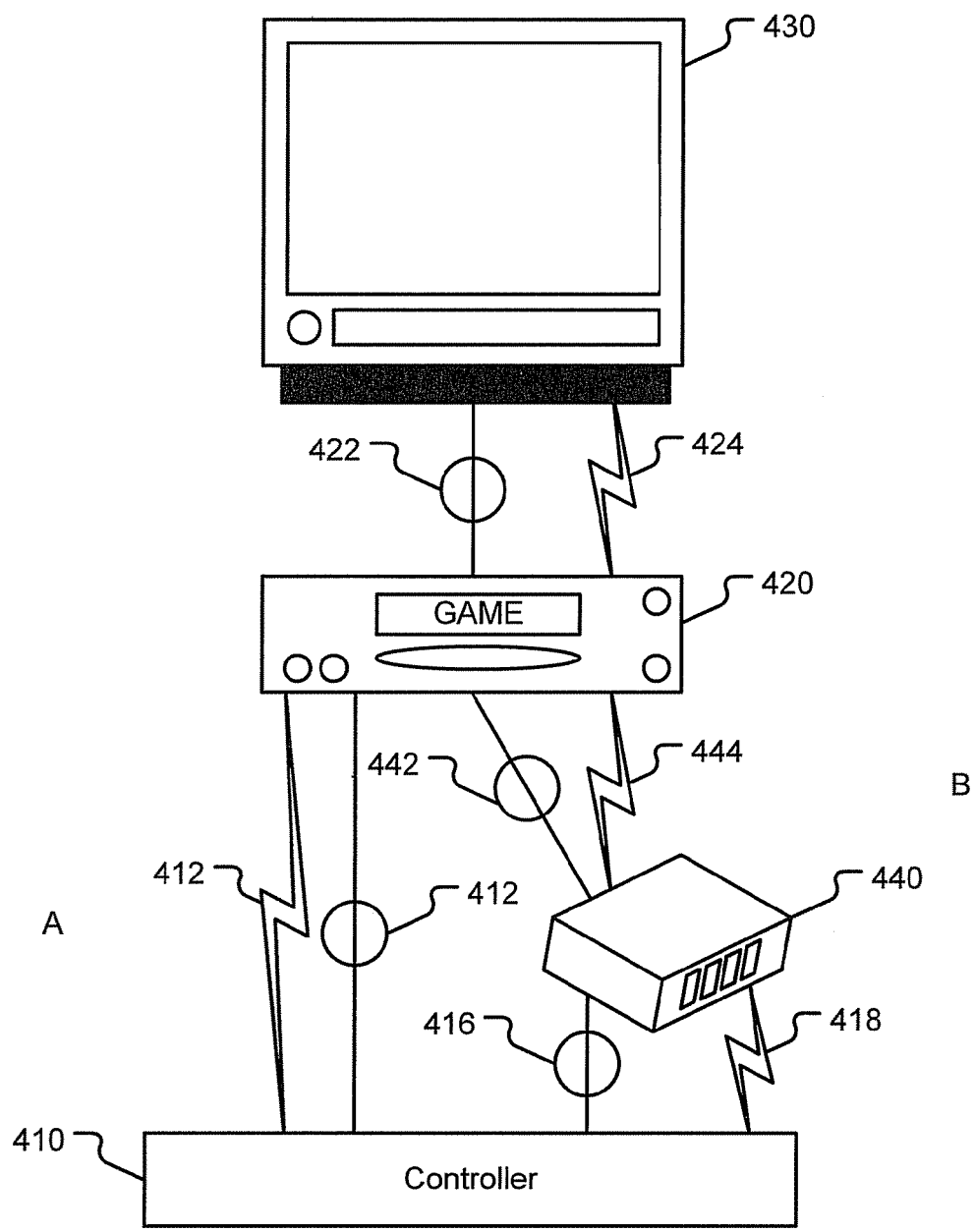
FIG. 4 is a diagrammatic representation of alternative specific exemplary embodiments of a gaming system as described herein in the case (A) where a controller-adapted set-top box is controller-ready and in the case (B) where an adapter is used to render the STB controller-adapted.

FIG. 4 is a diagrammatic representation of alternative specific exemplary embodiments of a gaming system as described herein in the case (A) where a controller-adapted set-top box is controller-ready and in the case (B) where an adapter is used to render the STB controller-adapted. In case A, controller 410 communicates with set-top box 420, either with a wireline connection 412 or wirelessly 414. The game software is installed on STB 420. STB 420 in turn communicates with display 430, such as a television set, to display the game images. STB 420 may communicate with display 430 either by wireline 422 or wirelessly 424.

In case B, controller 410 communicates with adapter 440 either by wireline connection 416 or wirelessly 418. Adapter 440 receives controller commands and transmits the commands to set-top box 420, which presumably, is otherwise unable to receive controller commands because it lacks a suitable controller port or other signal receiver/transmitter. Adapter 440 also transmits information, such as controller vibration functions, from the game software on STB 420 to controller 410. Alternative embodiments contemplate that adapter 440 translates information between controller 410 and STB 420 in cases where information exchange between them is facilitated by software translation. Adapter 440 may be, in a specific alternative embodiment, a connector between a familiar video game console platform and a set-top box having a game installed on it, so that the console "reads" the game from the set-top box instead of from a disk or other medium that it would usually use, and the player uses the console controller connected to the console just he or she normally would.

Figure 5:
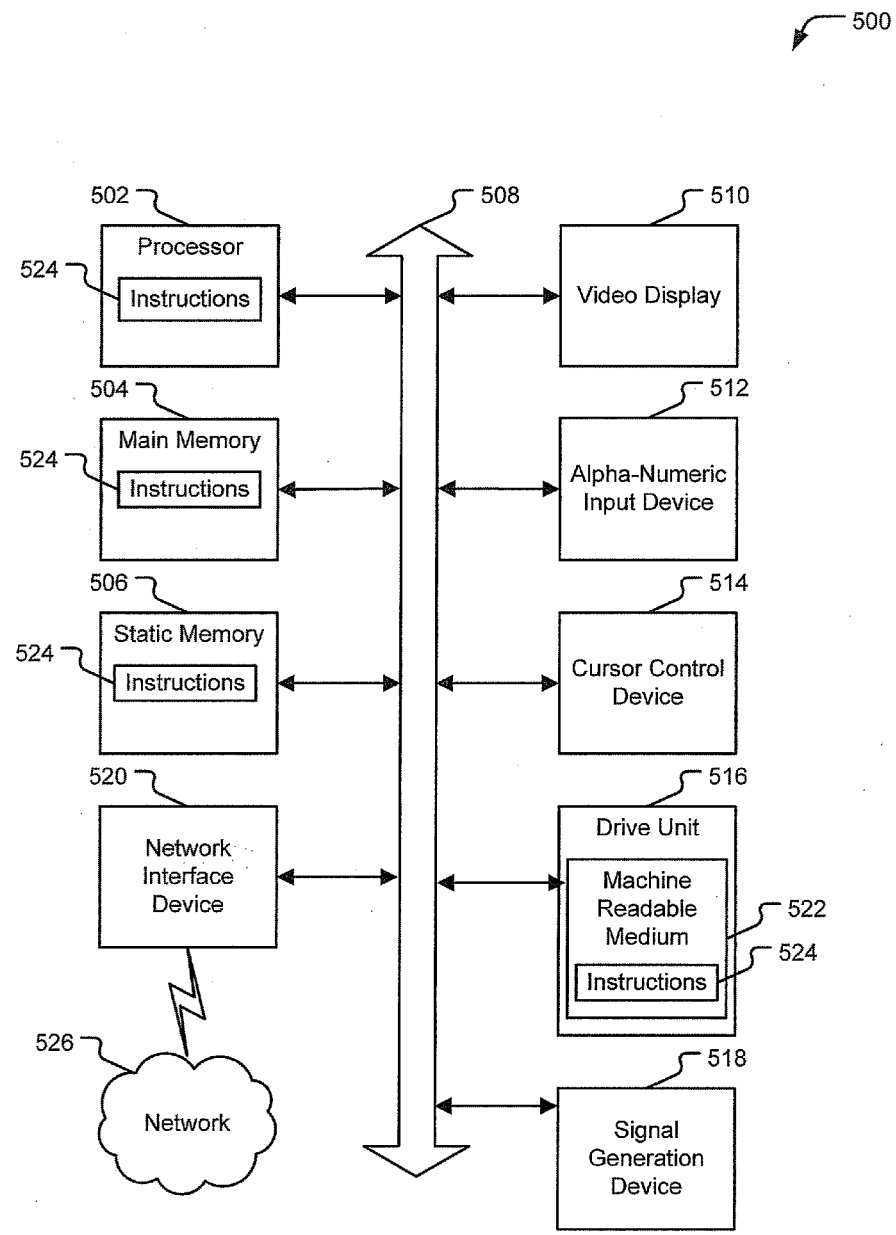
FIG. 5 is a diagrammatic representation of a programmable machine in the form of a computer system within which a set of instructions, when executed, may cause the machine to perform any one or more of the methodologies of the present disclosure.

The methods described herein are intended for operation as software programs running on a programmable machine such as a computer processor. FIG. 5 is a diagrammatic representation of a programmable machine in the form of a computer system 500 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a landline telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU), or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated in herein above. The instructions 524 may also reside, completely or at least partially, within the main memory 504, the static memory 506, and/or within the processor 502 during execution thereof by the computer system 500. The main memory 504 and the processor 502 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

Software implementations may include, but not be limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations described herein may be optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. The disclosure is considered to include a tangible storage medium or distribution medium, as listed herein and including art-recognized equivalents and successor media, in which the software implementations herein are stored.

Accordingly, those skilled in the art will recognize that the present disclosure extends to machine-readable media ("MRM") contain instructions for execution by a computer. MRM is broadly defined to include any kind of electronic memory such as floppy disks, conventional hard disks, CD-ROMs, Flash ROMS, nonvolatile ROM, RAM, Storage Media, email attachments, solid state media, magnetic media, and signals containing instructions, together with processors to execute the instructions.

It is understood that the words that have been used herein are words of description and illustration, rather than words of limitation. Changes may be made within the purview of the appended claims, as presently stated and as amended, without departing from the scope and spirit of the disclosure in all its aspects. Although the description has made reference to particular means, materials and embodiments, the disclosure is not intended to be limited to the particulars disclosed; rather, the disclosure extends to all functionally equivalent technologies, structures, methods and uses such as are within the scope of the appended claims.

We claim:

1. A non-transitory computer-readable storage medium comprising instructions that, when executed by a processor, cause the processor to:
   send a purchase order for a video game from a set-top box to a game-on-demand server connected to the set-top box via a secure network, wherein the game-on-demand server authenticates the purchase order;
   receive the video game from the game-on-demand server at the set-top box; and
   in response to a request from a subscriber to execute the video game at the set-top box, send an authorization request to the game-on-demand server;
   receive a determination from the game-on-demand server indicating whether the set-top box is authorized to access an account of the subscriber; and
   execute the video game at the set-top box when the determination indicates that the set-top box is authorized to access the account of the subscriber.

2. The non-transitory computer-readable storage medium of claim 1, wherein the set-top box comprises a database identifying recently played video games.

3. The non-transitory computer-readable storage medium of claim 1, further comprising instructions that, when executed by the processor, cause the processor to store a state of a particular video game that is being played at the set-top box.

4. The non-transitory computer-readable storage medium of claim 1, further comprising instructions that, when executed by the processor, cause the processor to retrieve a previously stored game.

5. The non-transitory computer-readable storage medium of claim 1, further comprising instructions that, when executed by the processor, cause the processor to enable the set-top box to play the video game with a second set-top box via the secure network.

6. The non-transitory computer-readable storage medium of claim 1, further comprising instructions that, when executed by the processor, cause the processor to send a message to the game-on-demand server to debit a particular amount from an account associated with the set-top box.

7. The non-transitory computer-readable storage medium of claim 6, wherein the particular amount is associated with a sale of the video game that includes unlimited game play.

8. The non-transitory computer-readable storage medium of claim 6, wherein the particular amount is associated with a rental of the video game, wherein the video game is unplayable after a pre-designated amount of time.

9. The non-transitory computer-readable storage medium of claim 6, wherein the particular amount is associated with a pay-for-play session of the video game, wherein the video game is unplayable after the video game has been played for a substantially contiguous amount of time.

10. The non-transitory computer-readable storage medium of claim 1, further comprising instructions that, when executed by the processor, cause the processor to:
    receive digital rights management data associated with the video game from the game-on-demand server; and
    manage digital rights associated with the video game based on the digital rights management data.

11. The non-transitory computer-readable storage medium of claim 10, further comprising instructions that, when executed by the processor, cause the processor to secure the video game from unauthorized access based on the digital rights management data.

12. The non-transitory computer-readable storage medium of claim 10, further comprising associating the digital rights management data with the set-top box.

13. The non-transitory computer-readable storage medium of claim 10, wherein the digital rights management data prevents the video game from being played at a second set-top box.

14. The non-transitory computer-readable storage medium of claim 10, wherein the digital rights for the video game are received from the game-on-demand server after the purchase order is authenticated, wherein the digital rights are associated with the set-top box that sent the purchase order.

15. The non-transitory computer-readable storage medium of claim 1, wherein when the subscriber is associated with the purchase order, the set-top box is authorized to execute the video game.

16. The non-transitory computer-readable storage medium of claim 1, wherein when the subscriber is different from a subscriber associated with the purchase order, the set-top box is not authorized to execute the video game.

17. A computer-implemented method, comprising:
receiving, at a game-on-demand server, an order for a video game from a set-top box, wherein the game-on-demand server is connected to the set-top box via a secure broadband network and wherein the video game is executable at the set-top box;
authenticating an identity of a subscriber associated with the set-top box;
determining whether the set-top box is authorized to receive the video game;
sending the video game from the game-on-demand server to the set-top box when the set-top box is authorized to receive the video game
receiving, at the game-on-demand server, an authorization request by the subscriber to execute the video game at the set-top box;
in response to receiving the authorization request determining whether the set-top box is authorized to access an account of the subscriber requesting execution of the video game; and
sending the determination to the set-top box, wherein the video game is executable at the set-top box when the determination indicates that the set-top box is authorized to access the account of the subscriber.

18. The non-transitory computer-implemented method of claim 17, further comprising automatically preventing the video game from executing at the set-top box after the occurrence of a pre-determined event.

19. The non-transitory computer-implemented method of claim 18, wherein the pre-determined event comprises an expiration of an authorization associated with the video game.

20. The non-transitory computer-implemented method of claim 19, wherein the authorization expires at a predetermined time after the video game is sent from the game-on-demand server to the set-top box.

* * * * *